US009405572B2

(12) United States Patent
Breitgand et al.

(10) Patent No.: US 9,405,572 B2
(45) Date of Patent: Aug. 2, 2016

(54) OPTIMIZED RESOURCE ALLOCATION AND MANAGEMENT IN A VIRTUALIZED COMPUTING ENVIRONMENT

(71) Applicant: International Business Machines Corporation, Armonk, NY (US)

(72) Inventors: David Breitgand, Modiin (IL); Zvi Dubitzky, Tivon (IL); Amir Epstein, Hezeliya (IL); Oshrit Feder, Kfar Saba (IL); Alexander Glikson, Kfar Saba (IL); Pavel Kravchenco, Nahariya (IL); Inbar Shapira, Givat Ada (IL); Giovanni Toffetti-Carughi, Como (IT)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/246,148

(22) Filed: Apr. 7, 2014

(65) Prior Publication Data
US 2015/0286492 A1 Oct. 8, 2015

(51) Int. Cl.
*G06F 9/46* (2006.01)
*G06F 9/455* (2006.01)

(52) U.S. Cl.
CPC .. *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,732,310 B2 | 5/2014 | Breitgand et al. | |
| 8,918,784 B1* | 12/2014 | Jorgensen | G06F 9/5077 718/1 |
| 2010/0107159 A1 | 4/2010 | Radhakrishnan et al. | |
| 2010/0107259 A1* | 4/2010 | Sullivan | H04L 29/06 726/26 |
| 2010/0306382 A1* | 12/2010 | Cardosa | G06F 9/5044 709/226 |
| 2011/0055377 A1* | 3/2011 | Dehaan | G06F 9/4856 709/224 |
| 2012/0089980 A1* | 4/2012 | Sharp | G06F 9/45558 718/1 |
| 2013/0283266 A1* | 10/2013 | Baset | G06F 9/485 718/1 |
| 2014/0032761 A1* | 1/2014 | Beveridge | G06F 9/5011 709/226 |
| 2014/0331222 A1* | 11/2014 | Zheng | G06F 9/5077 718/1 |
| 2014/0379930 A1* | 12/2014 | Ferris | G06F 9/5077 709/226 |
| 2015/0106805 A1* | 4/2015 | Melander | G06F 9/45537 718/1 |

OTHER PUBLICATIONS

Lindner et al., "Towards Automated Business-driven Indication and Mitigation of VM Sprawl in Cloud Supply Chains", 6th IFIP/IEEE International Workshop on Business Driven IT Management, May 2011, pp. 1062-1065.

(Continued)

*Primary Examiner* — Diem Cao
(74) *Attorney, Agent, or Firm* — Michael O'Keefe; Robert C. Bunker

(57) ABSTRACT

Machines, systems and methods for allocating resources to in a virtualized computing environment, the method comprising detecting one or more host machines with resources allocated to one or more virtual machines (VMs) that are in an idle state; reducing resource entitlements for at least one of the VMs that is detected to be in the idle state to make more resources available for allocation to VMs that are not in the idle state; and increasing resource entitlements for at least one of the VMs with reduced entitlement, in response to determining that the VM with reduced entitlement is no longer in the idle state.

11 Claims, 5 Drawing Sheets

(56) References Cited

OTHER PUBLICATIONS

Reiss et al., "Towards understanding heterogeneous clouds at scale: Google trace analysis", Intel Science and Technology Center for Cloud Computing, Carnegie Mellon University, Apr. 2012.

Giovanni Franzini, "Idle virtual machine detection in FermiCloud", Scientific Computing Division, Grid and Cloud Computing Department, Fermilab, Sep. 21, 2012.

IBM, "System and Method for Optimizing Virtual Sprawl Solutions", IP.com Prior Art Database Technical Disclosure, Apr. 2009.

Zhang et al., "Virtual Machine Migration in an Over-Committed Cloud", 2012 IEEE Network Operations and Management Symposium (NOMS), Apr. 2012, pp. 196-203.

Breitgand et al., "An Adaptive Utilisation Accelerator for Virtualized Environments," IEEE International Conference on Cloud Engineering, 2014, p. 165-174, IEEE Computer Society.

Breitgand et al., "Improving Consolidation of Virtual Machines with Risk-Aware Bandwidth Oversubscription in Compute Clouds," The 31st Annual IEEE International Conference on Computer Communications: Mini-Conference, 2012, p. 2861-2865, IEEE.

Breitgand et al., "Network Aware Virtual Machine and Image Placement in a Cloud," 9th CNSM and Workshops, 2013, p. 9-17, IFIP.

Breitgand et al., "SLA-aware Resource Over-Commit in an IaaS Cloud," 8th International Conference on Network and Service Management (CNSM 2012), 2012, p. 73-81, IFIP.

NetWrix, "NetWrix VMware Change Reporter," VMware Auditing and Reporting Datasheet, 2011, 2 Pages, NetWrix Corporation.

Padmanabhan, "Controlling Virtual Machine Sprawl for Efficient Resource Utilization," Dell Power Solutions, 2011, p. 18-20, Issue 1, Dell Inc.

Solarwinds, "Virtual Machine (VM) Capacity Planning Software," SolarWinds Solutions, p. 1-2, SolarWinds Worldwide, LLC., http://www.solarwinds.com/solutions/vm-capacity.aspx?id=152471341256, Accessed on Mar. 16, 2016.

VKernel, "Capacity Planning Software," About VKernel, p. 1, VKernel Corp., http://www.vkernel.com/company/, Accessed on Jan. 1, 15, 2013.

VMTurbo, "Virtualization Management & Data Center Control," VMTurbo Operations Manager, p. 1, VMTurbo, Inc., http://www.vmturbo.com/, Accessed on Jan. 15, 2013.

VMware, "VMware Capacity Planner," VMware Product Datasheet, 2009, p. 1-2, VMware, Inc.

VMware, "Lifecycle Manager User's Guide," vCenter Lifecycle Manager 1.2, 2010, p. 1-40, VMware, Inc.

* cited by examiner

OPTIMIZED RESOURCE ALLOCATION AND MANAGEMENT IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing resource allocation and management in a virtualized computing environment and, more particularly, to a system and method to optimize a private virtualized computing environment, where multiple virtual machines are deployed on multiple hosts.

BACKGROUND

The adoption of the virtualized computing model (also referred to as "the cloud") has had considerable implications on the business processes associated with provisioning and life cycle management of virtual machines (VMs) which are deployed over the cloud. Advantageously, the ease and speed of provisioning fully functional VMs with pre-configured software stacks has drastically improved the productivity of application developers, scientists and other users and consumers.

Despite the above advantages, proliferation of VMs has introduced major administrative challenges and issues, such as what is commonly referred to as "VM sprawl". VM sprawl is a consequence of VM creation without control mechanisms in place and can result in over-provisioning of VMs, where some resources (e.g., storage, processing, memory, etc.) are allocated to VMs that no longer utilize such resources. VM sprawl is common in both public and private cloud models, albeit it is typically more acute in the private cloud environment.

VM sprawl is caused by the way VMs are provisioned. In a virtualized computing environment, VM admission is generally governed by scheduling and placement algorithms dealing with capacity and constraints satisfaction. In the dynamic scenario of cloud computing, where several VMs are provisioned and leave the system over time, little is known about how a new VM will use it's requested (i.e., nominal) resources. As such, nominal capacity is used for capacity constraints satisfaction.

Deployed but unused VMs, typically, show a large discrepancy between nominal VM resource allocation and demand, and can prevent new VMs from being provisioned, due to the lack of available nominal resources. This effect is most costly, if the actual cloud utilization remains low. In other words, VM sprawl results in resource congestion which is manifested by a high nominal allocation of resources accompanied by a low actual utilization of the cloud infrastructure.

In practice, administrators experiment with different levels of resource over-commitment to try to cope with VM sprawl. However, it is often difficult to determine the trade-off between increased resource utilization and workload performance degradation due to resource congestion. Given the expected variance in workloads over time, an over-commit solution is likely to be less effective than adaptive solutions, which include reclaiming of resources allocated to abandoned VMs.

The currently applied dynamic solutions are unfortunately problematic as such methods are generally not transparent to users or are not user friendly. Further, such solutions are coarse grained and typically are implemented on ad hoc basis, with performance penalties or intrusive applications. It is desirable to implement methods that can dynamically and adaptively manage resource allocation in a virtualized computing environment.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for allocating resources to in a virtualized computing environment are provided. In accordance with one embodiment, the method comprises detecting one or more host machines with resources allocated to one or more virtual machines (VMs) that are in an idle state; reducing resource entitlements for at least one of the VMs that is detected to be in the idle state to make more resources available for allocation to VMs that are not in the idle state; and increasing resource entitlements for at least one of the VMs with reduced entitlement, in response to determining that the VM with reduced entitlement is no longer in the idle state.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, resource allocation and resource management in a private (or public) virtualized computing environment is optimized, where multiple virtual machines (VMs) are deployed on multiple hosts in the virtualized computing environment. As provided in further detail below, in one implementation, if a VM is deemed to be idle, resources are dynamically allocated or reallocated to the VM according to a reduced entitlement, until it is determined that the VM is active or starving for resources, for example.

Figure 1:
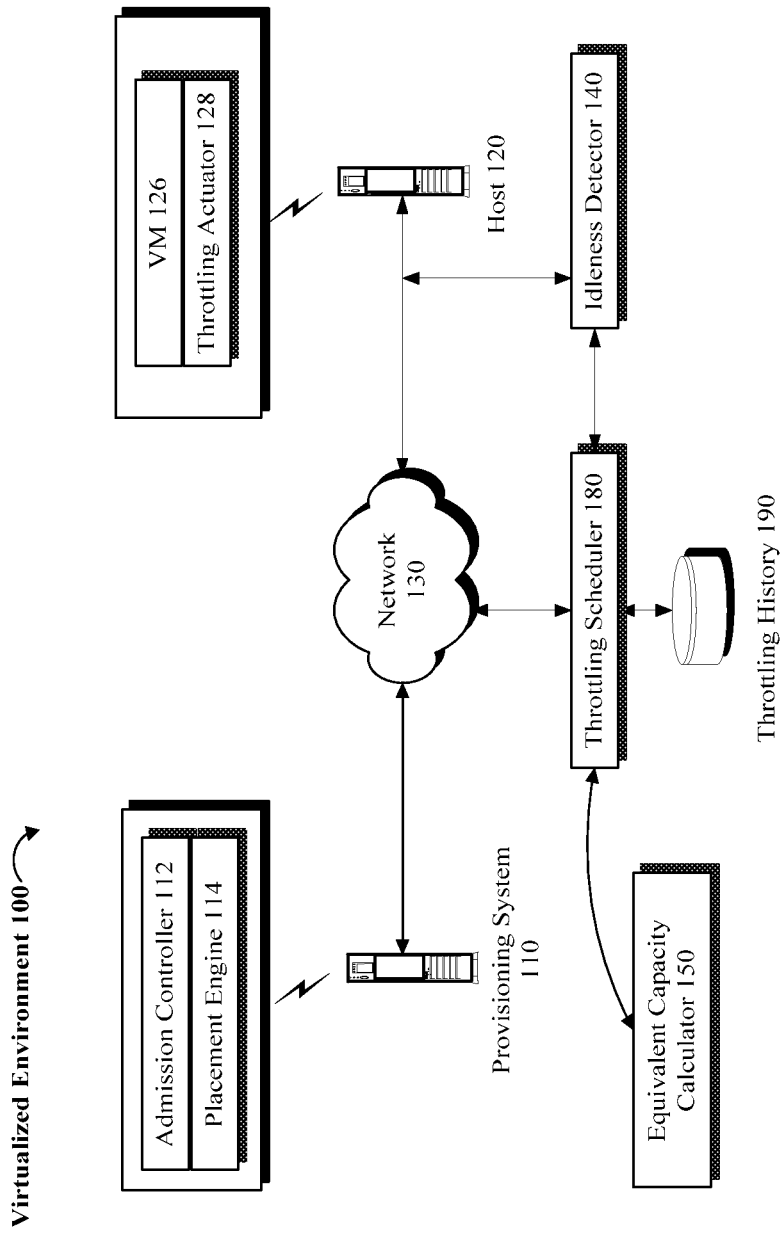
FIG. 1 illustrates an exemplary virtualized environment in accordance with one or more embodiments.
Figure 2:
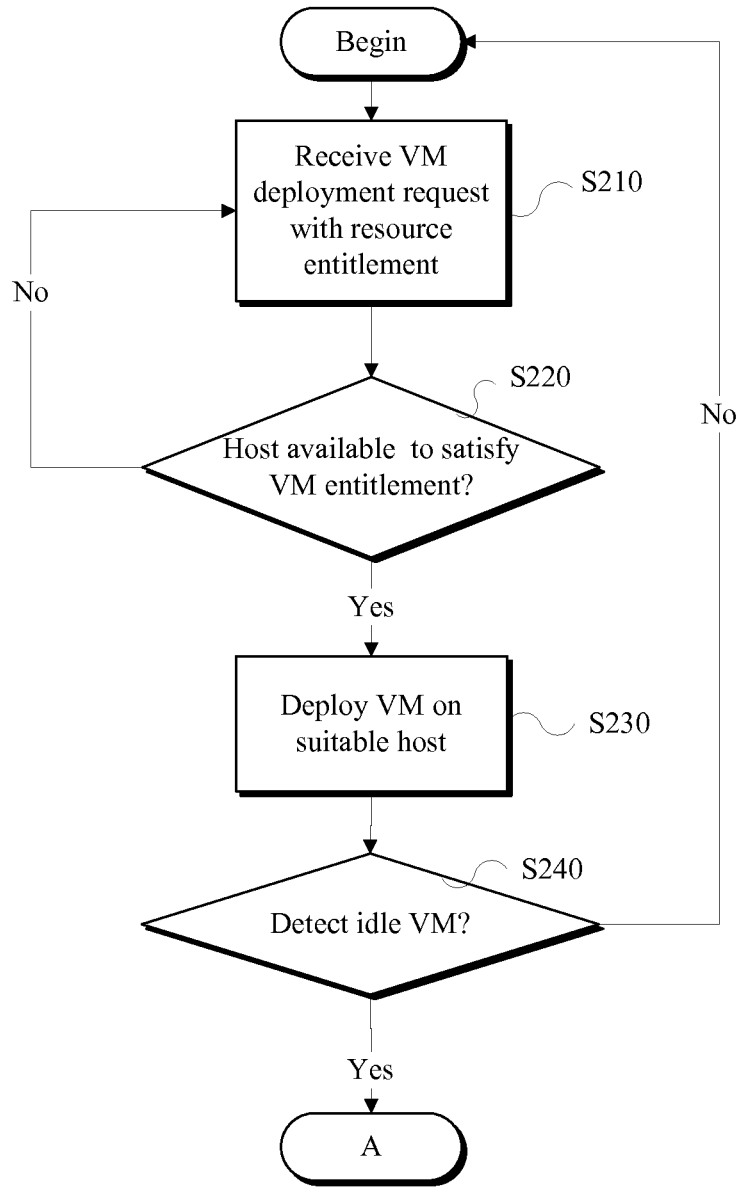
FIGS. 2 and 3 are flow diagrams of an exemplary method for optimizing resource management in a virtualized computing environment, in accordance with one embodiment.

Referring to FIG. 1, an exemplary virtualized environment 100 is illustrated, in accordance with one embodiment, in which various computing components are implemented for monitoring, provisioning and resource allocation over a plurality of hosts. Referring to FIGS. 1 and 2, a provisioning system 110 may be configured with an admission controller 112 that receives a request for deployment of a VM according to a first entitlement for resources (e.g., CPU, memory, storage, etc.) (S210). In response, the admission controller 112 may search for a host 120 connected to network 130, for example, where host 120 is able to satisfy the VM's requested resource entitlement (S220).

In one embodiment, a placement engine 114, optionally, implemented as a part of provisioning system 110, may be utilized to place and deploy a VM 126 on a host 120 (i.e., on a suitable host) that has sufficient resources to satisfy the VM's requested resource entitlement (S230). It is noteworthy that in a scenario where more than one suitable host is available for hosting the VM 126, different factors or conditions (e.g., locality, collocation, anti-collocation, host level congestion, priority concerns, bandwidth availability, etc.) may be used to help place the VM on the appropriate host or hosts.

In one implementation, an idleness detector 140 may be provided to monitor the VMs that are deployed across multiple hosts in the virtualized environment 100. By tracking and monitoring various parameters (e.g., resource usage, processor activity, keyboard or mouse usage, network bandwidth, input/output activity, virtual memory utilization, etc.) idleness detector 140 may identify one or more hosts with VMs that are underutilized (or not utilized at all). According, utilizing the idleness detector 140, a VM may be identified as being in an idle state (S240).

Figure 3:
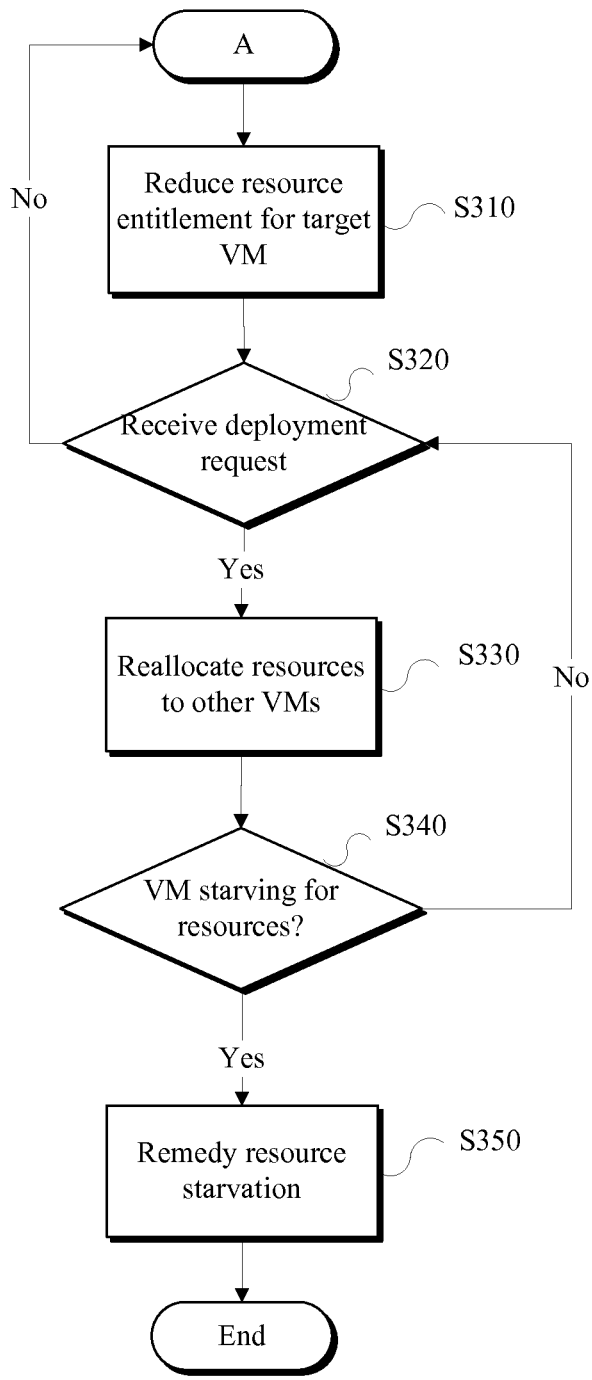

Referring back to FIG. 1, a throttling system comprising a throttling schedule 180 with access to throttling history 190 may be utilized to manage and monitor (i.e., throttle) activity of the VMs in virtualized environment 100. Referring to FIG. 3, when a VM is identified as being in an idle state, throttling scheduler 180 may be implemented to instruct a throttling actuator 128 to reduce the original resource entitlement for a target VM (e.g., an idling VM), for example (S310). Without limitation, the throttling actuator 128 may be executed over host 120 that is hosting the target VM.

The reduction in resource entitlement for a target VM may be achieved by, for example, updating the relevant records used by the provisioning system 110, so that the placement engine 114 would consider the target VM as not needing as much resources as per the VM's earlier entitlement (e.g., entitlement requested at time of VM deployment). If idling VM 125 is hosted on a host 120, some of the resources of the host 120 (that were previously allocated to the idling VM) may be deemed available for allocation to a non-idling VM after the reduction of resource entitlement for VM 126.

According to the above methodology, when new requests for deployment of additional VMs are received by the provisioning system 110 (S320), the admission controller 112 may reallocate the resources associated with the host 120 (i.e., resources that were previously allocated to the idling VM 126) to the other VMs (not shown) (S330). Desirably, after the reallocation, the idleness detector 140 may continue to dynamically monitor the resource needs and activities of idling VMs across one or more hosts in virtualized environment 100.

In one embodiment, if the idleness detector 140 determines that the idling VM 126 is starving for resources (S340), for example, due to pending requests or renewed activity associated with the VM 126, then idleness detector 140 may remedy the situation (S350) by requesting that the throttling scheduler 180 remove the VM 126 from the idle state and reinstates the VM's resource entitlement, or alternatively request that the provisioning system 110 to provision additional resources for the VM 126, so that the VM 126 does not continue to starve for resources.

Accordingly, depending on implementation, placement engine 114 may either provision additional resources for the VM 126 on the corresponding host 120. If the corresponding host 120 is congested with current provisioning and resource allocation for other VMs, then placement engine 114 may migrate the VM 126 to another host (not shown) in the virtualized environment, if the other host has sufficient resources to meet the VM's 126 resource entitlement.

In some embodiments, an equivalent capacity calculator 150 may be utilized by the throttling scheduler 180 to better optimize resource allocation among the VMs being hosted on the various hosts with different capacities for supporting the resource requirements of the VMs. For example, equivalent capacity calculator 150 may provide a placement plan that ensures all active VMs are placed with probability p, set as a policy, where p is calculated as $D_i = \mu_i + \sigma_i Z_{p_i}$, where:

$D_i$ is the equivalent demand for VMs of type i, $\mu_i$ is the average demand for VMs of type i, $\sigma_i$ is standard deviation of demand for VMs of type i, and Z is the $p_i$ quantile of unit normal distribution N(0,1).

In one embodiment, idle VMs are treated as VMs of type i+1, where nominal configuration of any throttled idle VM is a fraction $\alpha$ of a physical core (e.g., $\alpha=0.1$). In one example, a stochastic bin packing (SBP) algorithm may be used by the admission controller to decide whether to admit a new VM for placement, considering the throttling history 190 and resource optimization level for the currently placed VMs. For example, a new VM may be admitted by admission controller 112, if there is a placement such that the probability of a group of VMs placed at any host to consume more capacity than available at the host is no greater than p, where the effective size (ES) for a group G of VMs with maximum permissible infringement probability p may be defined by $ES(G,p) = \sum_{j \in G} \mu_j + Z\alpha (\sum_{j \in G} \sigma_j^2)^{1/2}$, where:

$\mu j$ and $\sigma j$ denote the mean and standard deviation of the resource demand of each VM j in group G, and $\alpha = 1 - p$ and $Z\alpha$ denotes the $\alpha$-percentile of the unit normal distribution $N(0,1)$.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
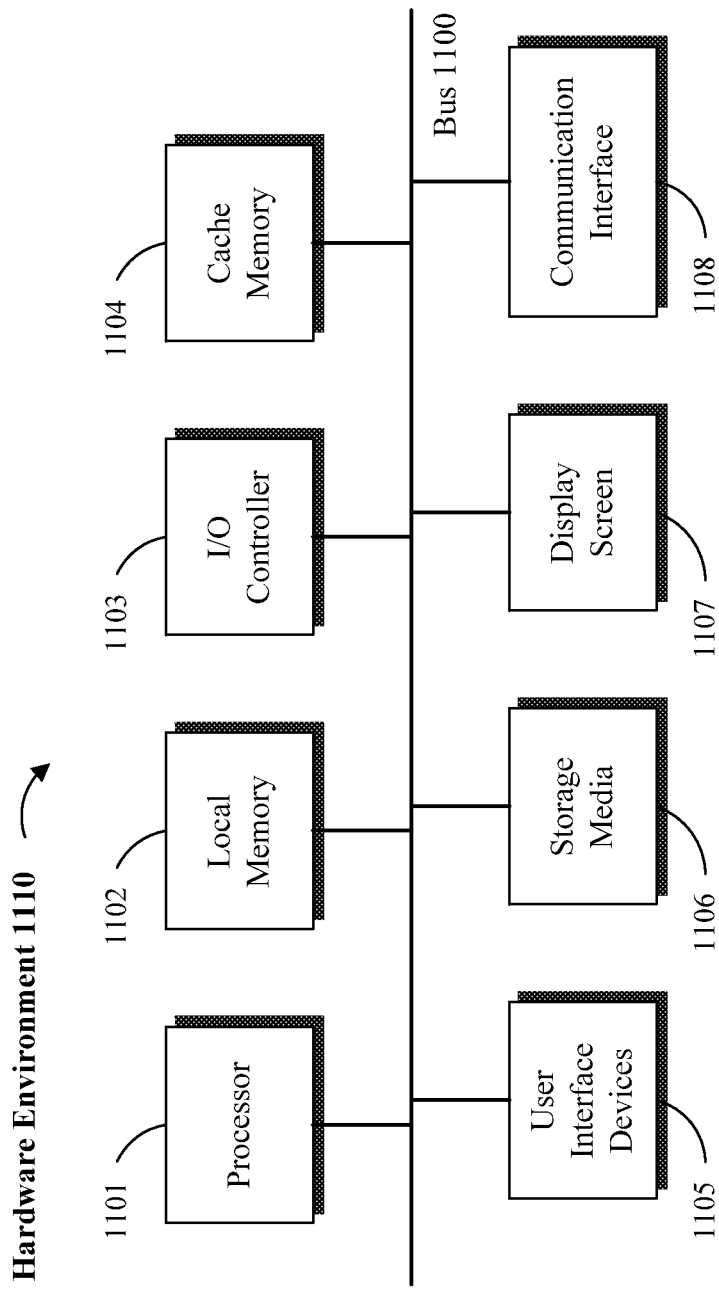
FIGS. 4A and 4B are block diagrams of hardware and software environments in which the disclosed systems and methods may operate, in accordance with one or more embodiments.
Figure 4B:
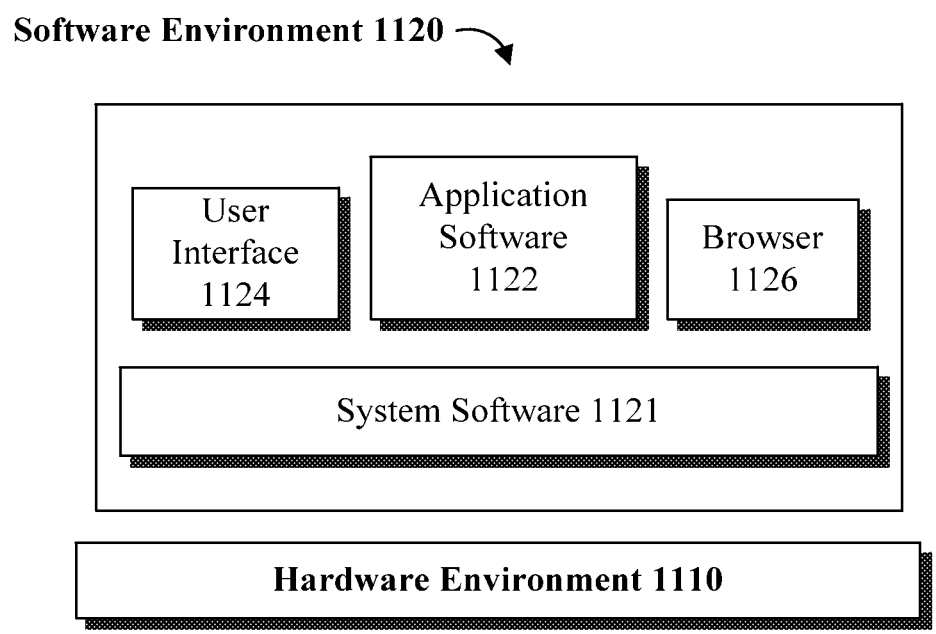

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for allocating resources in a virtualized computing environment, the method comprising:
   detecting, by an idleness detector, one or more host machines with resources allocated to one or more virtual machines (VMs) that are in an idle state;
   reducing, by the idleness detector triggering a throttling event, resource entitlements for at least one of the VMs that is detected to be in the idle state to make more resources available for allocation to VMs that are not in the idle state;
   increasing resource entitlements for at least one of the VMs with reduced entitlement, in response to determining that the VM with reduced entitlement is no longer in the idle state,
   wherein a throttling scheduler manages the throttling event to enable admission of additional VMs on an identified host machine for the purpose of resource allocation,
   wherein the admission of the additional VMs on the identified host machine is based on a probability of the additional VMs not causing the identified host machine to run out of allocated resources according to the following algorithm:

$$D_i = \mu_i + \sigma_i \cdot Z_{p_i}$$

$D_i$ is an equivalent demand for VMs of type i, $\mu_i$ is an average demand for VMs of type i, $\sigma_i$ is a standard deviation of demand for VMs of type i, and Z is a $p_i$ quantile of unit normal distribution N(0,1); and
   recording in a throttling history the placement of the additional VMs on the identified host machine.

2. The method of claim 1, wherein an admission controller manages the admission of new VMs into the virtualized computing environment, in response to determining that at least one or more hosts have free resources to allocate to a new VM.

3. The method of claim 2, wherein the idleness detector identifies that a VM is no longer in the idle state based on determining that an idle VM is highly utilizing remaining resources allocated to the VM.

4. The method of claim 3, wherein resource starvation is manifested by high resource utilization.

5. The method of claim 4, wherein the throttling scheduler attempts to restore an earlier entitlement of resources for an idle VM with reduced entitlement, in response to determining that the VM is starving for resources.

6. The method of claim 5, wherein the starving VM is migrated from a first host to a second host, in response to determining that the earlier entitlement for resources is not restorable.

7. The method of claim 6, wherein the admission controller prevents allocation of additional resources to any VM, in response to determining that no host is present with available resources to accommodate the migration of the starving VM.

8. A system for allocating resources in a virtualized computing environment, the system comprising:
   a processor; and
   a non-transitory computer readable storage medium having program instructions embodied therewith, the program instructions executable by the processor to cause the system to:
   detect, by an idleness detector, one or more host machines with resources allocated to one or more virtual machines (VMs) that are in an idle state;
   reduce, by the idleness detector triggering a throttling event, resource entitlements for at least one of the VMs that is detected to be in the idle state to make more resources available for allocation to VMs that are not in the idle state;
   increase resource entitlements for at least one of the VMs with reduced entitlement, in response to determining that the VM with reduced entitlement is no longer in the idle state,
   wherein a throttling scheduler manages the throttling event to enable admission of additional VMs on an identified host machine for the purpose of resource allocation,
   wherein the admission of the additional VMs on the identified host machine is based on a probability of the additional VMs not causing the identified host machine to run out of allocated resources according to the following algorithm:

$$D_i = \mu_i + \sigma_i \cdot Z_{p_i}$$

$D_i$ is an equivalent demand for VMs of type i, $\mu_i$ is an average demand for VMs of type i, $\sigma_i$ is a standard deviation of demand for VMs of type i, and Z is a $p_i$ quantile of unit normal distribution N(0,1); and
   record in a throttling history the placement of the additional VMs on the identified host machine.

9. The system of claim 8, wherein an admission controller manages the admission of new VMs into the virtualized computing environment, in response to determining that at least one or more hosts have free resources to allocate to a new VM.

10. A computer program product comprising a computer readable storage medium having program instructions embodied therewith, wherein the computer readable storage medium is not a transitory signal per se, the program instructions executable by a computer to perform a method for allocating resources in a virtualized computing environment, the method comprising:
    detecting, by an idleness detector, one or more host machines with resources allocated to one or more virtual machines (VMs) that are in an idle state;
    reducing, by the idleness detector triggering a throttling event, resource entitlements for at least one of the VMs that is detected to be in the idle state to make more resources available for allocation to VMs that are not in the idle state;
    increasing resource entitlements for at least one of the VMs with reduced entitlement, in response to determining that the VM with reduced entitlement is no longer in the idle state,
    wherein a throttling scheduler manages the throttling event to enable admission of additional VMs on an identified host machine for the purpose of resource allocation,
    wherein the admission of the additional VMs on the identified host machine is based on a probability of the additional VMs not causing the identified host machine to run out of allocated resources according to the following algorithm:

$$D_i = \mu_i + \sigma_i \cdot Z_{p_i}$$

$D_i$ is an equivalent demand for VMs of type i, $\mu_i$ is an average demand for VMs of type i, $\sigma_i$ is a standard deviation of demand for VMs of type i, and Z is a $p_i$ quantile of unit normal distribution $N(0,1)$; and recording in a throttling history the placement of the additional VMs on the identified host machine.

11. The computer program product of claim 10, wherein an admission controller manages the admission of new VMs into the virtualized computing environment, in response to determining that at least one or more hosts have free resources to allocate to a new VM.

* * * * *